United States Patent [19]
Franklin

[11] 3,870,191
[45] Mar. 11, 1975

[54] HOT GREASE GUARD FOR COOKING UTENSIL

[76] Inventor: Harold J. Franklin, 1410C - 24th St., North, Birmingham, Ala. 35234

[22] Filed: May 20, 1974

[21] Appl. No.: 471,362

[52] U.S. Cl. .............................. 220/370, 220/94 R
[51] Int. Cl. ............................................ B65d 51/16
[58] Field of Search .......................... 220/369–374, 220/94 R, 381; 126/384; 55/384

[56] References Cited
UNITED STATES PATENTS
3,807,596  4/1974  Baker................................. 220/369
3,809,281  5/1974  Kalkwowski..................... 220/370

Primary Examiner—George T. Hall
Attorney, Agent, or Firm—Jennings, Carter & Thompson

[57] ABSTRACT

A hot grease guard having a disc of a size to cover a cooking utensil. The disc is supported for pivotal movement to selected angular positions relative to a supporting handle and is provided with a laterally and outwardly opening slot adapted to receive a fork-like member with the disc being rotatable by the fork-like member and the fork-like member being movable to selected positions along the slot.

6 Claims, 4 Drawing Figures

HOT GREASE GUARD FOR COOKING UTENSIL

BACKGROUND OF THE INVENTION

This invention relates to a hot grease guard for cooking utensils and more particularly to such a guard which covers the cooking utensil and also permits turning or removal of the food being cooked without removing the guard from its protecting position whereby hot grease does not come into contact with the cook.

Heretofore in the art to which my invention relates, many devices have been proposed to prevent hot grease from coming into contact with the cook while cooking foods, such as chicken, fish and the like. While such devices protect the cook while the device is in place on the cooking utensil, they do not permit turning or removal of the individual pieces of food being cooked without removing the protective cover from its protecting position. Accordingly, while such foods are being removed or turned, the protective cover is removed whereby the face, hands and clothing of the cook are no longer protected.

BRIEF SUMMARY OF THE INVENTION

In accordance with my invention, I provide a disc-like member which is mounted for rotation at one end of a supporting handle. A laterally and outwardly opening slot is provided in the disc-like member in position to receive a fork-like member whereby the disc-like member is rotatable by the fork-like member and the fork-like member is movable to selected positions inwardly of the disc-like member. The disc-like member is formed of a transparent material or a perforated material whereby the cook may view the food being cooked as the food is turned or removed from the cooking utensil. The outwardly opening slot is provided with a resilient sealing surface along at least one side which is deformed by the fork-like member as it is moved to selected positions along the slot, thus permitting free movement of the fork-like member relative to the slot and at the same time substantially sealing the slot. Outwardly projecting members are carried by the periphery of the disc-like member at opposite sides of the slot to facilitate rotation of the disc-like member and to facilitate insertion of the fork-like member into the slot.

Apparatus embodying features of my invention is illustrated in the accompanying drawings, forming a part of this application, in which.

Figure 2:
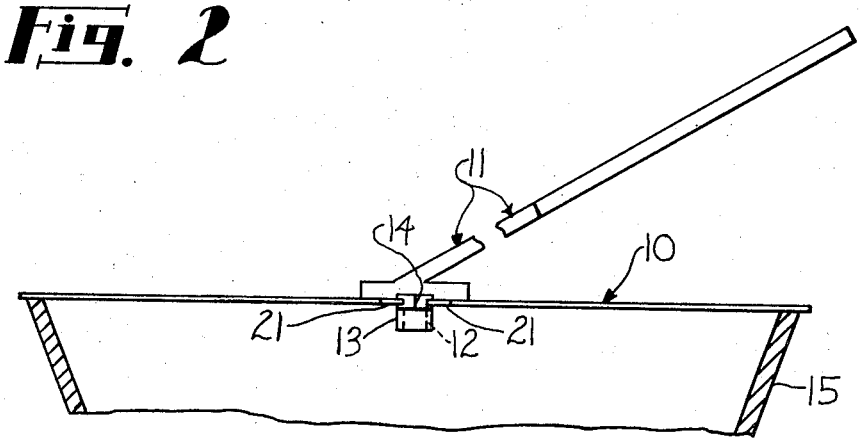
FIG. 2 is a side elevational view thereof showing a fragment of a cooking utensil.

Referring now to the drawings for a better understanding of my invention, I show a disc-like member 10 which is of a size to cover a conventional cooking utensil 15, such as a frying pan. Preferably, the disc-like member 10 is formed of a transparent material whereby the food being cooked can be viewed by the cook as the food is cooked, turned or removed from the utensil.

Figure 1:
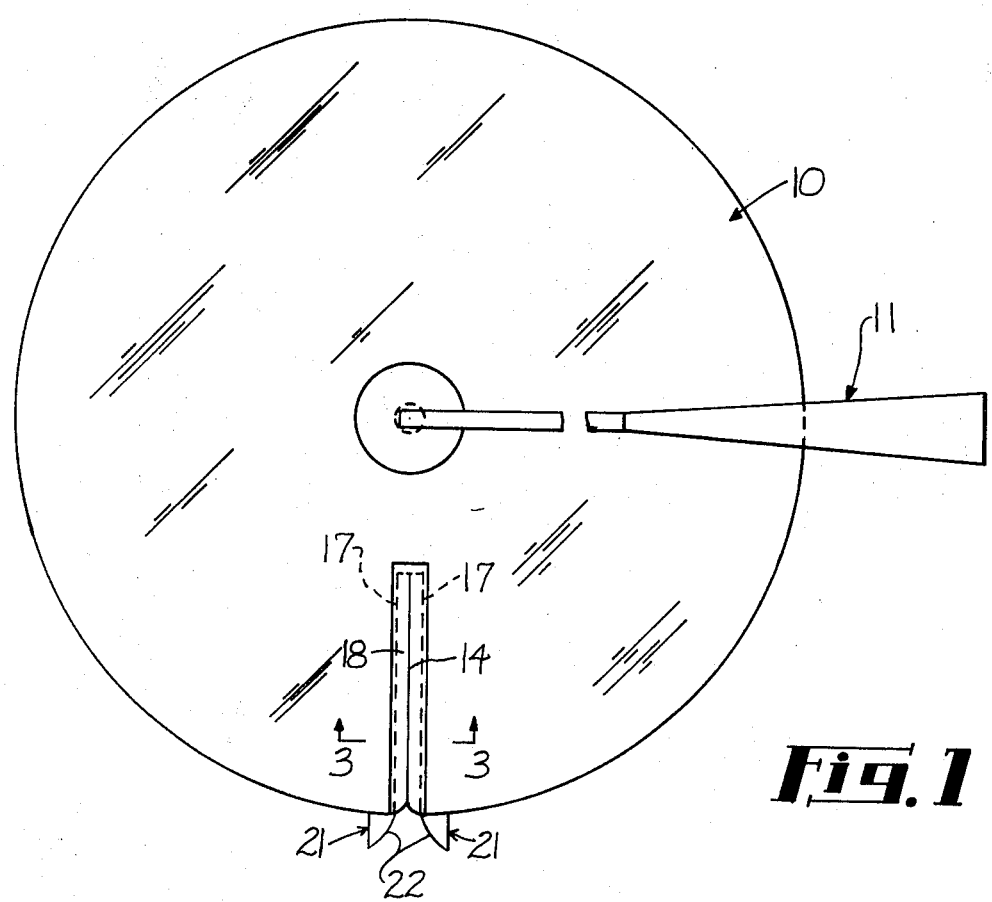
FIG. 1 is a top plan view of my improved hot grease guard.

As shown in FIGS. 1 and 2, the disc-like member 10 is pivotally connected to one end of a handle 11 whereby the disc-like member is adapted for pivotal movement to selected angular positions relative to the handle 11. Preferably, the handle 11 is pivotally connected to the central portion of the disc-like member 10, as shown in FIG. 1. The handle 11 is provided with adepending projection 12 which extends through a centrally disposed opening provided in the disc-like member 11 and is provided with a threaded lower end portion for receiving a retaining member, such as a suitable nut 13. It will be understood that there is sufficient play between the disc-like member 10 and the adjacent parts of the handle 11 whereby the disc-like member 10 is adapted for free rotation relative to the handle.

A laterally and outwardly opening slot 14 is provided in the disc-like member 10 for receiving a fork-like member 16 whereby the disc-like member 10 may be rotated by the fork-like member 16 after it is inserted in the slot 14 and moved to selected positions relative thereto. The fork-like member 16 can thus reach selected pieces of food being cooked regardless of the position of the piece of food within the cooking utensil 15. That is, since the disc-like member 10 is rotatable relative to the handle and the fork-like member 16 is adapted for movement to selected positions along the outwardly opening slot 14, the fork-like member is adapted for both radial movement and angular movement relative to the handle and the cooking utensil in which the food is being cooked.

Figure 3:
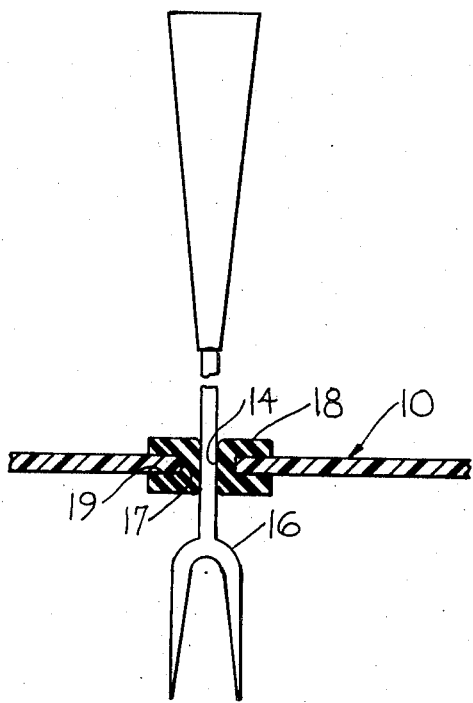
FIG. 3 is an enlarged, sectional view taken generally along the line 3—3 of FIG. 1; and, FIG. 4 is a fragmental, sectional view corresponding to FIG. 3 showing a slightly modified form of my invention.

Preferably, the outwardly opening slot 14 is provided with a resilient sealing surface, as shown in FIG. 3. That is, a relatively wide, outwardly opening slot 17 is provided in the disc-like member 10 for receiving a sealing member 18 which may be in the form of a suitable resilient material, such as plastic or the like, which will withstand elevated temperatures. As shown in FIG. 3, a groove 19 may be provided in the sealing member 18 for receiving the adjacent portions of the disc-like member 10 which define the outwardly opening slot 17. The sealing member 18 is deformed by the fork-like member 16 as the fork-like member is moved to selected positions along the slot 14 whereby the slot is substantially closed by the resilient sealing member 18, as shown in FIG. 1.

As shown in FIGS. 1 and 2, projections 21 extend outwardly from the periphery of the disc-like member 11 at opposite sides of the outwardly opening slot 14 in position to be engaged by the fork-like member 16. Accordingly, the disc-like member 10 may be rotated without actually inserting the fork-like member 16 into the slot 14 by merely engaging the projections 21. Also, as shown in FIG. 1, the surfaces of the projections 21 facing each other are curved inwardly as at 22 toward the adjacent edges of the outwardly opening slot to facilitate insertion of the fork-like member into the slot.

Figure 4:
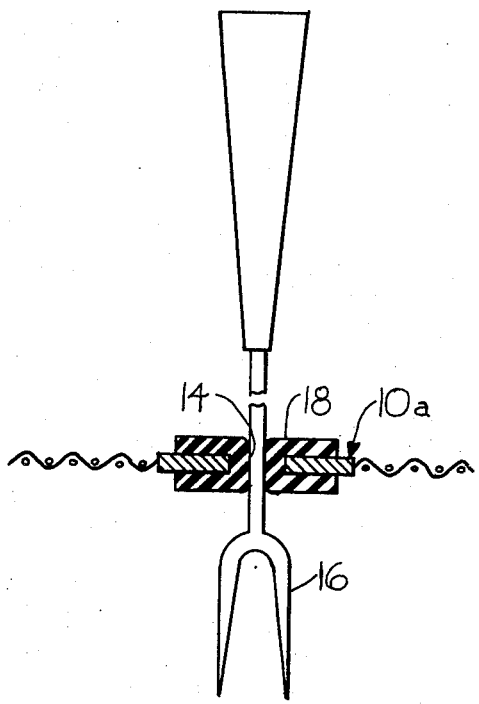

In FIG. 4 of the drawings, I show a slightly modified form of my invention in which the disc-like member, indicated at $10^a$, is formed of a perforated material, such as screen material or the like, instead of the transparent material shown in the embodiments shown in FIGS. 1–3. The screen material is provided with relatively small passageways therethrough whereby hot grease will not pass through the disc-like member $10^a$. It will be understood to one skilled in the art that other suitable materials may be employed for forming the disc-like member. The disc-like member $10^a$ is provided with a resilient sealing member 18 having an outwardly opening slot 14 therein, as described hereinabove, for receiving a fork-like member 16. and transferred to a platter or the like, the fork-like member 16 remains in the outwardly opening slot 14 whereby the disc-like member 10 remains in a protective position between the cook and the piece of food being removed. That is, the fork-like member 16 and the disc-like member 10 move together as the food is transferred from the cooking utensil 16 to a platter.

From the foregoing, it will be seen that I have devised an improved hot grease guard. By providing a rotatable disc-like member having an outwardly opening slot in one side thereof, the fork-like member is adapted for free movement to selected positions inwardly and outwardly of the cooking utensil as well as to any angular position relative to the cooking utensil. Accordingly, individual pieces of food may be reached regardless of their position within the cooking utensil. By providing the resilient sealing member 18, the outwardly opening slot 14 is substantially closed as the fork-like member 16 is moved to selected positions along the slot. Furthermore, by providing the outwardly extending projection 21, the disc-like member 10 may be rotated by a fork or the like without actually inserting the fork in the slot 14. Furthermore, by providing the curved, facing surfaces 22 on the projections 21, the fork-like member 16 is guided into the open end of the outwardly opening slot 14 thus facilitating insertion of the fork-like member.

While I have shown my invention in two forms, it will be obvious to those skilled in the art that it is not so limited but is susceptible of various other changes and modifications without departing from the spirit thereof.

What I claim is:

1. A hot grease guard for a cooking utensil comprising
   a. a disc-like member of a size to cover a cooking utensil,
   b. a handle pivotally connected to a central portion of said disc-like member with said disc-like member being adapted for pivotal movement to selected angular positions relative to said handle, and
   c. a laterally and outwardly opening slot in said disc-like member disposed to receive a fork-like member so that said disc-like member is rotatable to position said fork-like member at selected angular positions and said fork-like member is movable to selected positions inwardly of said disc-like member.

2. A hot grease guard as defined in claim 1 in which said disc-like member is transparent.

3. A hot grease guard as defined in claim 1 in which said disc-like member is perforated.

4. A hot grease guard as defined in claim 1 in which said laterally and outwardly opening slot is provided with a resilient sealing surface along at least one side thereof which is deformed by said fork-like member as said fork-like member is moved to selected positions along said slot whereby said slot is substantially closed by said sealing surface.

5. A hot grease guard as defined in claim 1 in which at least one projection extends outwardly from the periphery of said disc-like member in position to be engaged by said fork-like member for turning said disc-like member.

6. A hot grease guard as defined in claim 5 in which one of said projections is carried by the periphery of said disc-like member at each side of said outwardly opening slot with facing surfaces of said projections being curved inwardly toward the adjacent edges of said outwardly opening slot to facilitate insertion of the fork-like member into said slot.

* * * * *